United States Patent
Graves et al.

(10) Patent No.: US 11,715,617 B2
(45) Date of Patent: Aug. 1, 2023

(54) METHOD AND APPARATUS FOR SYNCHRONIZING CHARGED PARTICLE PULSES WITH LIGHT PULSES

(71) Applicant: Arizona Board of Regents on behalf of Arizona State University, Scottsdale, AZ (US)

(72) Inventors: William Graves, Tempe, AZ (US); Mark Holl, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 139 days.

(21) Appl. No.: 17/407,748

(22) Filed: Aug. 20, 2021

(65) Prior Publication Data

US 2021/0384001 A1    Dec. 9, 2021

Related U.S. Application Data

(63) Continuation of application No. PCT/US2020/018998, filed on Feb. 20, 2020.
(Continued)

(51) Int. Cl.
| | | |
|---|---|---|
| H01J 35/14 | (2006.01) | |
| H05G 1/02 | (2006.01) | |
| H05G 1/28 | (2006.01) | |
| H05G 1/52 | (2006.01) | |
| H04N 5/32 | (2023.01) | |

(52) U.S. Cl.
CPC ............ *H01J 35/153* (2019.05); *H05G 1/02* (2013.01); *H05G 1/28* (2013.01); *H05G 1/52* (2013.01); *H01J 2235/08* (2013.01); *H04N 5/32* (2013.01)

(58) Field of Classification Search
CPC ...... H01J 35/14; H01J 35/153; H01J 2235/08; H05G 1/28; H05G 1/52; H05G 1/02;
(Continued)

(56) References Cited

U.S. PATENT DOCUMENTS

| | | |
|---|---|---|
| 4,707,608 A | 11/1987 | DiBianca |
| 7,016,470 B2 | 3/2006 | Lawrence et al. |
| (Continued) | | |

FOREIGN PATENT DOCUMENTS

DE    102011082821 A1    10/2012

OTHER PUBLICATIONS

Arizona Board of Regents on behalf of Arizona State University, International Search Report and Written Opinion, PCT/US2020/018998, dated May 11, 2020, 9 pgs.
(Continued)

*Primary Examiner* — Jurie Yun (74) *Attorney, Agent, or Firm* — Morgan, Lewis & Bockius LLP (57) ABSTRACT

Some embodiments of the present disclosure provide a method that includes colliding a laser with an electron beam to produce backscattered x-rays while the electron beam is traversing a circular arc. This backscattering process is inverse Compton scattering (ICS). ICS x-rays are emitted in the same direction as the electrons. Because this ICS direction is changing as a function of time, the position of the x-ray beam on a detector will change depending on the timing of electron/laser collision. This position change is easily detected and converted to a timing measurement sensitive at the femtosecond scale, converting a very difficult timing measurement of laser pulse, electron pulse, and x-ray pulse synchronization into a simple and robust position measurement.

36 Claims, 10 Drawing Sheets

Related U.S. Application Data (60) Provisional application No. 62/809,350, filed on Feb. 22, 2019.

(58) Field of Classification Search
CPC .......... H05G 2/00; H04N 5/32; H01S 3/0903; H01S 4/00
See application file for complete search history.

(56) References Cited

U.S. PATENT DOCUMENTS

| | | | |
|---|---|---|---|
| 7,310,408 B2 * | 12/2007 | Filkins | H05G 2/00 378/119 |
| 8,345,824 B2 | 1/2013 | Nose et al. | |
| 8,822,936 B2 | 9/2014 | Olsen et al. | |
| 2007/0014392 A1 | 1/2007 | Madey et al. | |
| 2016/0302295 A1 | 10/2016 | Umstadter | |

OTHER PUBLICATIONS

Arizona Board of Regents on behalf of Arizona State University, International Preliminary Report on Patentability, PCT/US2020/018998, dated Aug. 10, 2021, 7 pgs.

Arizona Board of Regents on behalf of Arizona State University, Extended European Search Report, EP20759869.9, dated Oct. 24, 2022, 8 pgs.

A. Ovodenko, et al., "High Duty Cycle Inverse Compton Scattering X-Ray Source," American Institute of Physics, vol. 109, No. 25, Dec. 22, 2016, 5 pgs.

* cited by examiner

METHOD AND APPARATUS FOR SYNCHRONIZING CHARGED PARTICLE PULSES WITH LIGHT PULSES

CROSS-REFERENCE TO RELATED APPLICATIONS

This application is a continuation of PCT/US20/18998, filed Feb. 20, 2020, which claims the benefit of, and priority to, U.S. Provisional Application No. 62/809,350, filed Feb. 22, 2019, each of which is herein incorporated by reference in its entirety.

TECHNICAL FIELD

The disclosed embodiments relate generally to x-ray and charged particle pulses, and more specifically to synchronizing charged particle pulses with light pulses (e.g., to determine a time of arrival of a charged particle pulse relative to a light pulse).

BACKGROUND

State-of-the-art x-ray light sources are useful for time-resolved scientific studies, where the desired time resolution is at the femtosecond (fs) level. In such studies, multiple beams including laser, x-ray, and electron beams are synchronized at the same (e.g., femtosecond) level to accomplish new science. Achieving this level of synchronization is a pressing challenge in the field.

SUMMARY

In one aspect, a method includes directing a first light beam to intersect with a charged particle beam at a first location in a first region to produce a first x-ray beam. The method includes detecting a position on a detector where at least a portion of the first x-ray beam impinges; and determining a timing synchronization of the charged particle beam relative to the first light beam based on the position.

In some embodiments, the first light beam includes a plurality of pulses of the first light beam, the charged particle beam includes a plurality of pulses of the charged particle beam. When a respective pulse of the plurality of pulses of the first light beam impinges a respective pulse of the plurality of pulses of the charged particle beam, a pulse of the first x-ray beam is produced. The timing synchronization is between the respective pulse of the first light beam and the respective pulse of the charged particle beam.

In some embodiments, the method further includes directing a second light beam to intersect the charged particle beam, before the first light beam intersects the charged particle beam, to produce a second x-ray beam; and directing the second x-ray beam to an experimental end station. In some embodiments, the first light beam and the second light beam are derived from a common light source.

In some embodiments, the method further includes directing a third light beam from the common light source to the experimental end station. In some embodiments, the charged particle beam travels along a curved trajectory caused by a magnetic field in the first region. In some embodiments, the timing synchronization is a function of a position along the curved trajectory at which the first light beam intersects the charged particle beam. In some embodiments, the position on the detector is determined by the position along the curved trajectory at which the first light beam intersects the charged particle beam.

In some embodiments, the method includes selecting a magnitude of the magnetic field so that charged particles having a central energy in the charged particle beam travel along a selected path. In some embodiments, a larger portion of energy from the common light source is in the second light beam than in the first light beam.

In some embodiments, the method includes recording a first position on the detector where a first x-ray pulse impinges, the first x-ray pulse generated using a first pulse of the charged particle beam and a first pulse of the first light beam, The method further includes recording a second position on the detector where a second x-ray pulse impinges, the second x-ray pulse generated using a second pulse of the charged particle beam and a second pulse of the first light beam. The method includes converting a distance between the first position and the second position to time delays between respective times of arrival of respective pulses of the charged particle beam relative to respective pulses of the first light beam.

In some embodiments, converting the distance to the time delay is based on a distance between the first location and the detector. In some embodiments, the first x-ray pulse is produced through inverse Compton scattering (ICS). In some embodiments, the pulsed charged particle beam is a relativistic beam. In some embodiments, the first light beam is a pulsed laser beam. In some embodiments, the charged particle beam includes an electron beam. In some embodiments, the electron beam comprises pulses of electrons.

In some embodiments, the first light beam comprises pulses of light and a repetition rate of the pulses of light is equal to a repetition rate of the pulses of electrons. In some embodiments, the repetition rate is 1 kHz.

In one aspect, a time synchronization device includes a detector configured to measure a position where an x-ray pulse produced by a charged particle beam impinges on the detector, a camera configured to produce an image of the position on the detector where the x-ray pulse impinges; and a computer system including one or more processors and memory storing instructions for converting the position on the detector to a measurement of a timing synchronization between the charged particle beam and a light beam.

In some embodiments, the x-ray pulse is produced by colliding the charged particle beam with the light beam from a light source. In some embodiments, the charged particle beam collides with the light beam in a region having a magnetic field. In some embodiments, the magnetic field is configured to cause the charged particle beam to travel on a curved trajectory. In some embodiments, the detector is configured to be placed within a housing that is held under vacuum. In some embodiments, the camera is configured to be placed outside the housing. In some embodiments, the detector includes a scintillator, and the scintillator is configured to emit luminescence when excited by the x-ray pulse. In some embodiments, the scintillator includes a yttrium aluminum garnet (YAG) screen. In some embodiments, the charged particle beam is produced by an accelerator. In some embodiments, the charged particle beam is a relativistic beam. In some embodiments, the light beam includes a pulsed laser beam. In some embodiments, the charged particle beam includes an electron beam. In some embodiments, the electron beam includes pulses of electrons. In some embodiments, the light beam includes pulses of light and a repetition rate of the pulses of light is equal to a repetition rate of the pulses of electrons. In some embodiments, the repetition rate is 1 kHz.

In one aspect, a method includes determining a timing synchronization between an electron pulse and a light pulse, generating an x-ray pulse by colliding the light pulse with the electron pulse at a first location, measuring a position on a detector where the x-ray pulse impinges, and calculating the timing synchronization based on the position and a distance between the detector and the first location.

In some embodiments, the first location is within a magnetic field and the electron pulse travels along a circular trajectory. In some embodiments, calculating the timing synchronization further includes using a value of a radius of curvature of the circular trajectory of the electron pulse. In some embodiments, the electron pulse travels at greater than 99% of the speed of light.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Some embodiments of the present disclosure provide a method that includes colliding (e.g., intersecting, interacting) a laser with an electron beam to produce backscattered x-rays while the electron beam is traversing a circular arc. Hereinafter, the terms "colliding", "intersecting", and "interacting" as used in this description denote the same types of interaction between an electron pulse and a light pulse, unless otherwise stated. This backscattering process is inverse Compton scattering (ICS). ICS x-rays are emitted in the same direction as the electrons (e.g., tangential to the direction of travel of the electrons). A direction of x-rays emitted via ICS changes as a function of time due to movement of the electron pulse along a circular trajectory. This causes a position of the x-ray beam on a detector to change depending on a timing (and thus the position or location) of the electron laser collision (and the resulting x-ray generation). This position change is readily detected and converted to a timing measurement sensitive at the femtosecond scale, converting a very difficult timing measurement of laser pulse, electron pulse, and x-ray pulse synchronization into a simple and robust position measurement.

Figure 1A:
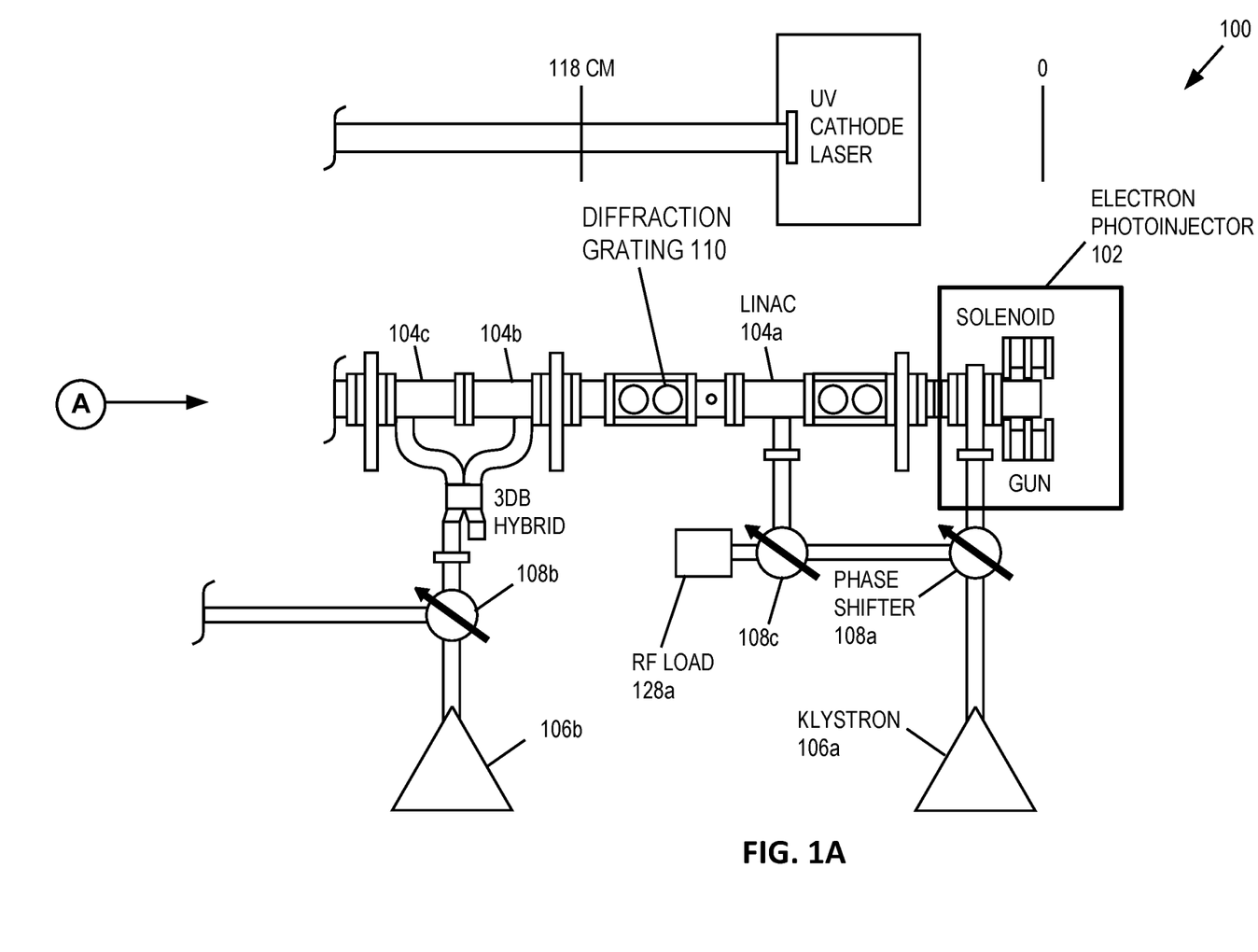
FIGS. 1A-1C are schematic diagrams illustrating a light source (e.g., an x-ray light source such as a free-electron laser) in accordance with some embodiments.
Figure 1B:
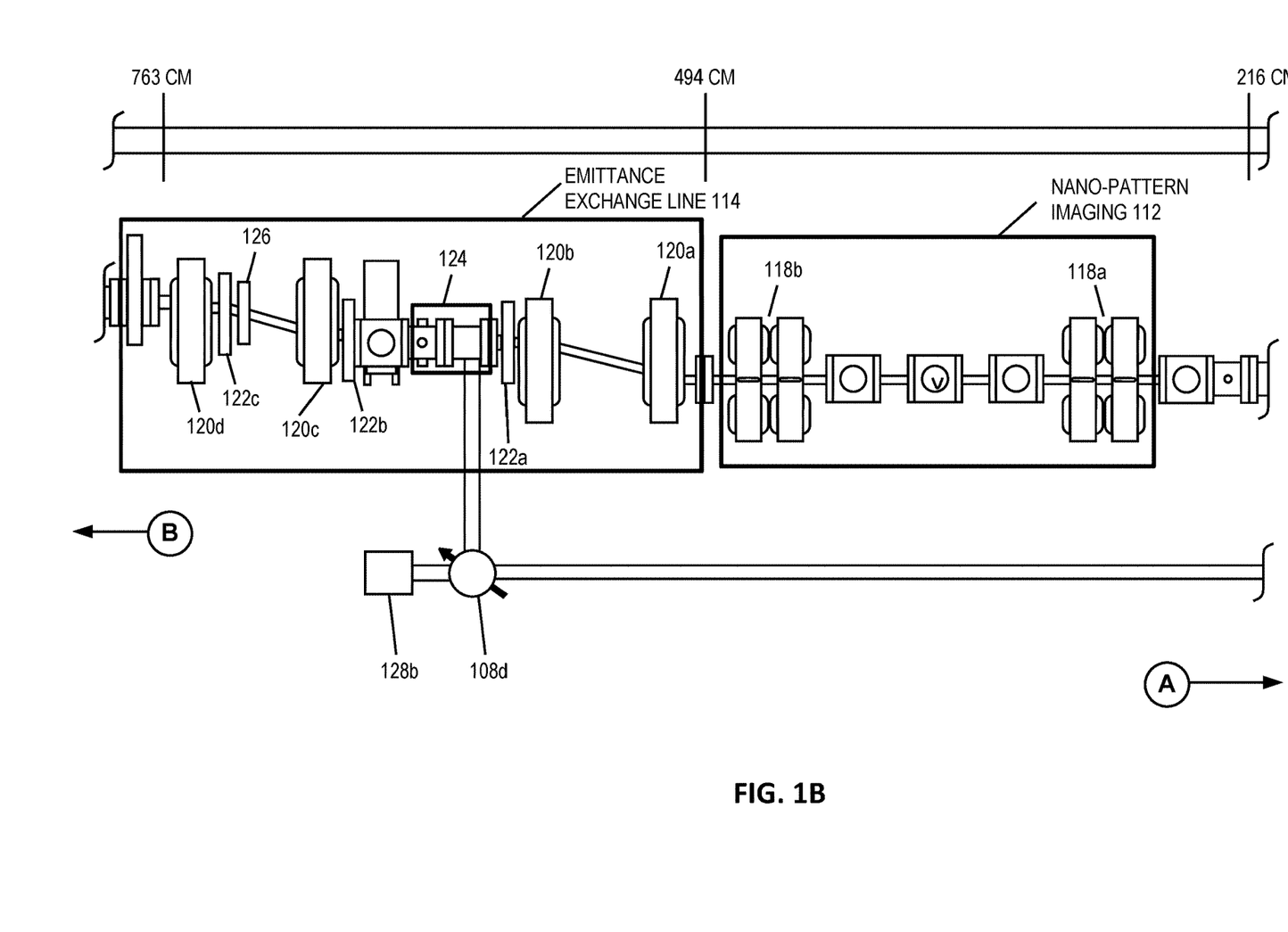
Figure 1C:
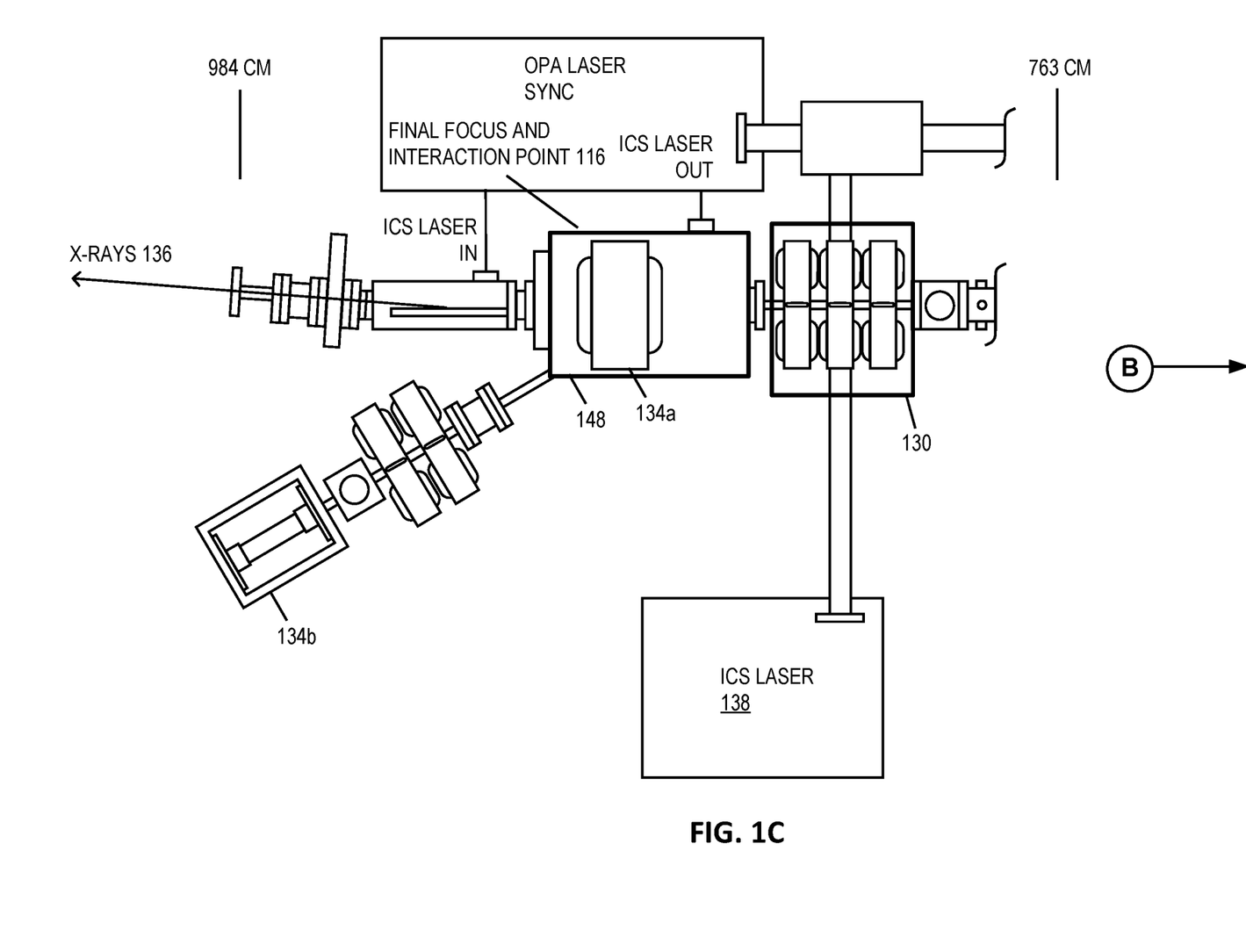

FIGS. 1A-1C are schematic diagrams illustrating a light source 100 (e.g., a free-electron laser) in accordance with some embodiments. For brevity, only some of the most pertinent aspects of the light source 100 are discussed in detail below.

In some embodiments, light source 100 produces x-rays. In some embodiments, light source 100 produces hard x-rays (e.g., x-rays having energies above 1 keV). In some embodiments, light source 100 produces soft x-rays or extreme ultraviolet light. In some embodiments, as described below, the light (e.g., x-rays) produced by light source 100 is fully spatially- and temporally-coherent (e.g., light source 100 produces light with coherence properties similar to those of conventional lasers emitting light at optical, ultraviolet, infrared, or other wavelengths). In some embodiments, light source 100 generates light by interacting a relativistic electron beam with an electromagnetic field (e.g., either from a UV laser, in the case of inverse Compton scattering, as described below, or from an undulator). For some embodiments in which an undulator is used, light source 100 generates light using a much shorter undulator than conventional FELs (e.g., ~10 meters as opposed to ~100 meters). Thus, light source 100 is sometimes referred to as a compact x-ray free-electron laser (CXFEL).

FIG. 1A shows an electron photoinjector 102 generating and initially accelerating an electron bunch. For example, in some embodiments, a 4 MeV electron beam is generated by a 4.5 cell x-band photoinjector, which comprises a solenoid and an RF gun. The photoinjector is followed (e.g., downstream) by one or more linear accelerator (LINAC) sections (LINAC sections 104a-104c, respectively), powered by one or more klystrons (klystrons 106a-106b). For example, in some embodiments, three 35 cm long LINAC sections 104a-106c accelerate the electron beam to 35 MeV.

In some embodiments, RF power from a single klystron 106 is applied to several different components (e.g., klystron 106b powers both LINAC section 104b and LINAC section 104c as well as RF deflector cavity and accelerator cavity 124, whereas klystron 106a powers both the initial acceleration of the electron bunch and LINAC 105c). Further, in some embodiments, phase shifters 108 (e.g., phase shifters 108a-108d) apply a phase shift to the power supplied by the various klystrons 106 to the various components. In some embodiments, RF loads 128 (e.g., RF loads 128a-128b) are introduced for load balancing and control.

The diffraction grating 110 is arranged in a transmission geometry with respect to the path of the electron bunch (e.g., the direction of propagation of the electron bunch). In some embodiments, the diffraction grating 110 diffracts the electron beam having a tunable energy with a maximum of 12 MeV.

FIGS. 1B and 1C show a variety of electron optics for patterning and shaping the electron bunch downstream of the LINAC sections 104. The electron optics of light source 100 includes three main sections: a nano-pattern imaging section 112, an emittance exchange (EEX) section 114, and an inverse Compton scattering (ICS) interaction section 116. In some embodiments, the ICS interaction section 116 is replaced with an undulator (e.g., an undulator less than 20 m in length).

The nano-patterning imaging section 112 is downstream of LINAC section 104c and, in some embodiments, includes two quadrupole triplets 118 (e.g., quadrupole triplet 118a and quadrupole triplet 118b) forming a telescope system. Quadrupole magnets create a magnetic field whose magnitude grows rapidly with the radial distance from its longitudinal axis. This property is useful in particle beam focusing.

The EEX section 114 includes four bend magnets 120a-120d, an RF deflector cavity and an accelerator cavity (collectively 124) that are independently phased and powered, along with sextupoles magnets 122a-122-c and octopole magnets 126 for aberration correction.

After the EEX section 114, the ICS interaction section 116 starts with a focusing triplet 130 that reduces the electron beam size at the ICS interaction point 132 (e.g., to approximately a micron) before colliding the electron beam with ICS laser field from an inverse Compton scattering laser 138 (e.g., light from the inverse Compton scattering laser 138 is piped in and redirected to be nearly parallel with the electron beam at the ICS interaction point 132). The collision of the electron beam with the ICS laser field produces x-rays (or other light) 136. Downstream the ICS interaction point 132, two dipoles 134a-134b respectively bend the beam into a beam dump (e.g., by 30 degrees horizontally and 90 degrees, respectively, into a vertical beam dump). In some embodiments, as shown in FIG. 1C, the beam dump is below the magnetic 134b, along the x-direction (into the plane of the drawing).

In some embodiments, the collision of the electron beam with the ICS laser field is within a magnet field of dipole magnet 134a. ICS interaction section 116 is an example of a light-generating apparatus. An undulator (not shown) is another example of a light-generating apparatus.

Figure 1D:
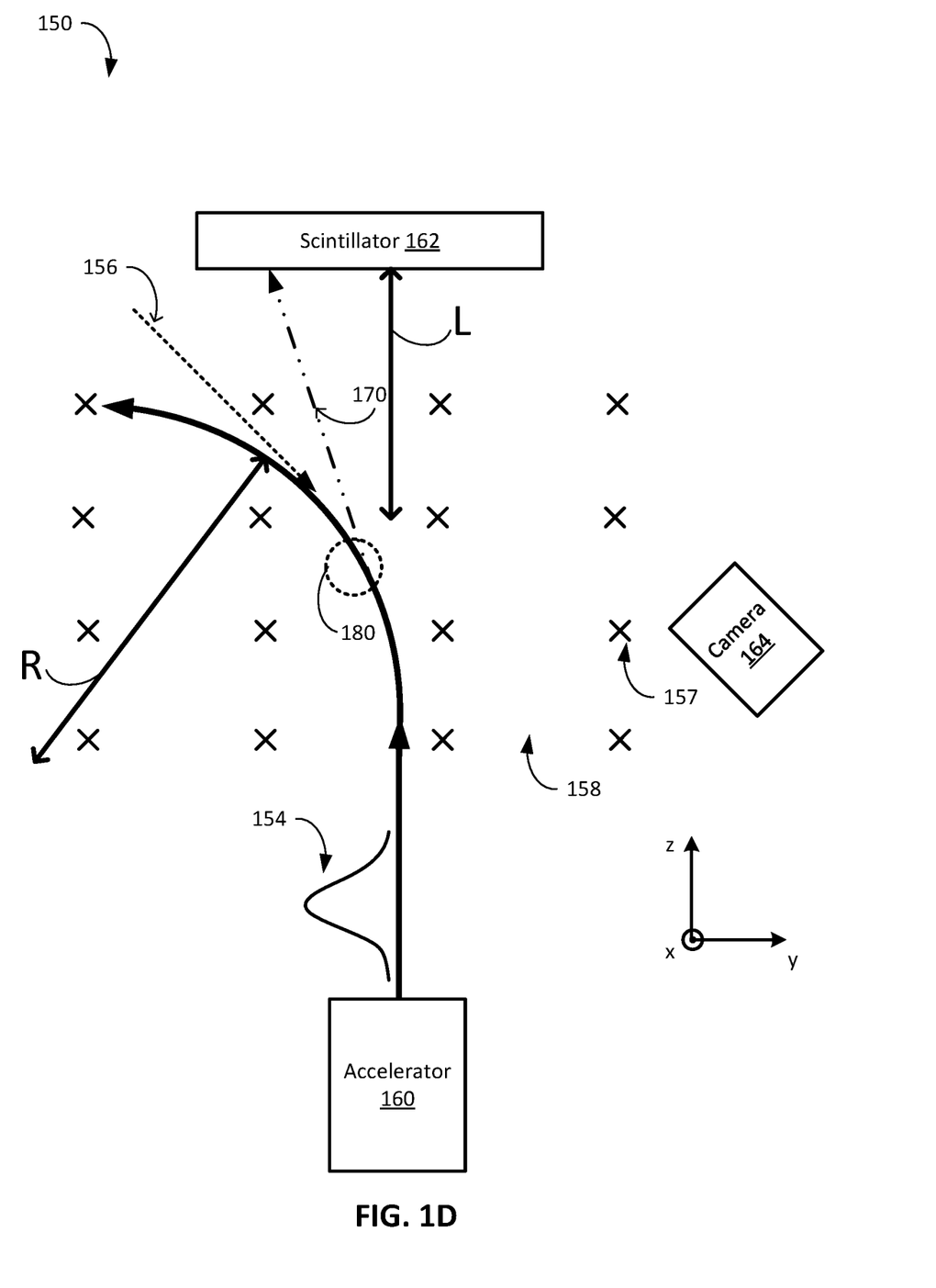
FIG. 1D is a schematic diagram illustrating an apparatus for synchronizing charged particle pulses with light pulses (e.g., where the interaction of the charged particle pulse and the light pulse produce the x-rays), according to some embodiments.

FIG. 1D is a schematic diagram illustrating an apparatus 150 for synchronizing a timing of a pulsed charged particle beam 154 with a pulsed light beam 156, according to some embodiments. In some embodiments, synchronizing a pulsed charged particle beam with a pulsed light beam includes determining a time of arrival of the pulsed charged particle beam relative to the pulsed light beam. Hereinafter, the pulsed charged particle beam will be referred to as an electron beam. In general, however, the methods and systems disclosed herein can be used for charged particle beams such as ions or other charged particles. The terms "charged particle pulses" and "pulsed charged particle beam" are synonymous, as used in this description, unless otherwise indicated.

The apparatus 150 includes an x-ray detector. In some embodiments, the x-ray detector includes a scintillator 162 and a camera 164 that measures light emitted by the scintillator 162. The scintillator 162 includes a material that exhibits scintillation, in which a small flash of visible or ultraviolet light is emitted by fluorescence or phosphorescence (e.g., luminescence), when the material is struck by a charged particle or high-energy photon (or otherwise excited by ionizing radiation).

The scintillator 162 glows when impinged by an x-ray pulse, and the camera 164 images the scintillator, allowing for the capture and measurement of the position of the glow. In some embodiments, the scintillator is a yttrium aluminum garnet (YAG) screen. In some circumstances, a beam diameter of the x-ray pulse 170 produced via ICS in the collision of the light pulse 156 and the electron beam 154 at a location 180 is on the order of tens of microns. In some embodiments, the scintillator 162 provides a spatial resolution of at least 10 μm (e.g., two points 10 μm or more apart on the scintillator can be distinguished). In some embodiments, the scintillator provides spatial resolution up to 1 μm.

In some embodiments, the electron beam is a relativistic beam produced by an accelerator 160 (not drawn to scale). In some embodiments, the accelerator 160 includes the components 102 through 130 shown in FIGS. 1A-1C, such as one or more of an RF gun, klystrons, chicanes, and the like. The accelerator 160 denotes all the components used to deliver an electron beam to the interaction region at the final focus of the light source 100. In some embodiments, the relativistic beam is an electron beam traveling close to the speed of light (e.g., 70%, 80%, 90%, 99%, 99.9% the speed of light).

In some embodiments, the pulsed light beam is a pulsed laser beam. In some embodiments, the pulsed laser beam has a wavelength $\lambda_1$ in the infrared, optical, or ultraviolet spectra.

The apparatus 150 operates in a first region 158 having a magnetic field 157. The magnetic field 157 is produced by a magnet. In some embodiments, the magnet is an electromagnet. In some embodiments, the magnet is a permanent magnet. In some embodiments, the magnet is a dipole magnet. In accelerators, a dipole magnet creates a homogeneous magnetic field over some distance (region). Charged particle motion in that field will be circular in a plane perpendicular to the field. In some circumstances, a charged particle injected into a region having a magnetic field created by a dipole magnet travels along a circular (e.g., when the magnetic field is perpendicular to the velocity of the charged particle). By adding several dipole sections on the same plane, the bending radial effect of the charged particle beam increases.

In some embodiments, the first region 158 corresponds to the region within the magnetic field produced by the dipole magnet 134a in FIG. 1C (the magnetic field 157 is generated by the dipole magnet 134a). In some embodiments, the apparatus 150 does not include the magnet, and the apparatus 150 is simply placed in a region already subjected to the magnetic field 157. For example, the magnetic field 157 is already present to direct the charged particle beam 154 toward a beam dump to safely dispose of charged particles used to produce x-ray pulses 170, independently of the timing synchronization. In some embodiments, the apparatus 150 includes the magnet used to produce the magnetic field 157.

In some embodiments, a radius of curvature, R, (as shown in FIG. 1D) of the circular trajectory is about 80 cm. A magnetic field needed used to produce such a radius of curvature is can be estimated by assuming that the electrons are moving at nearly the speed of light. A stronger magnetic field produces a smaller R, which improves time resolution. However, the spent electron beam 154 leaving the interaction region 116 should be disposed of at the beam dump, which restricts possible trajectories of the electron beam 154 and also the size of R.

Figure 1E:
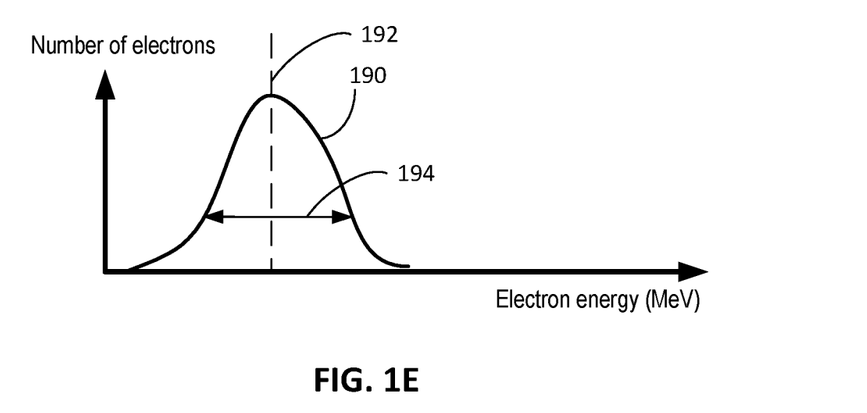
FIG. 1E is a schematic diagram illustrating an energy distribution of charged particle pulses, according to some embodiments.

The energy of the electron beam 154 also influences the size of R. Under a constant magnetic field, R increases as the energy of the electron beam increases. FIG. 1E shows an energy distribution 190 of an electron beam. The energy distribution 190 has a central energy 192, and a spread 194 of electron energies. In some embodiments, a magnetic field strength is adjusted (e.g., by adjusting a size of a current through an electromagnet) to keep electrons having the central energy 192 on the same trajectory (i.e., same R), regardless of the value of the central energy 192.

Varying the magnetic field strength to keep the electrons on the same trajectory helps to ensure that a majority of the spent electron beam leaving the interaction region 116 reaches the beam dump. In some embodiments, a typical energy (e.g., a central energy 192) is about 20 MeV. In some embodiments, the range of electron energy is between 7-40 MeV for a compact x-ray light source (CXLS). In contrast to CXFEL, x-ray pulses generated from CXLS are not coherent.

In some embodiments, the pulsed light beam is a pulsed laser beam from a laser source that has a first repetition rate. In other words, pulses of laser light are emitted from the laser source at the first repetition rate. In some embodiments, the laser source that produces the light 156 is a Trumpf Dira 200-1 Yb:YAG amplifier. In some embodiments, the Trumpf Dira generates pulses that are 1.5 ps long with a pulse energy of 200 mJ at 1 kHz repetition rate. Optics (e.g., mirrors, beamsplitter, etc.) direct light 156 from the laser source to intersect or collide (e.g., interact) with the electron beam 154, as shown in FIG. 1D.

In some embodiments, the electron beam is a sequence of electron pulses at a second repetition rate. In some embodiments, the first repetition rate is equal to the second repetition rate. In some embodiments, the first repetition rate and the second repetition rates are both 1 kHz.

Figure 4:
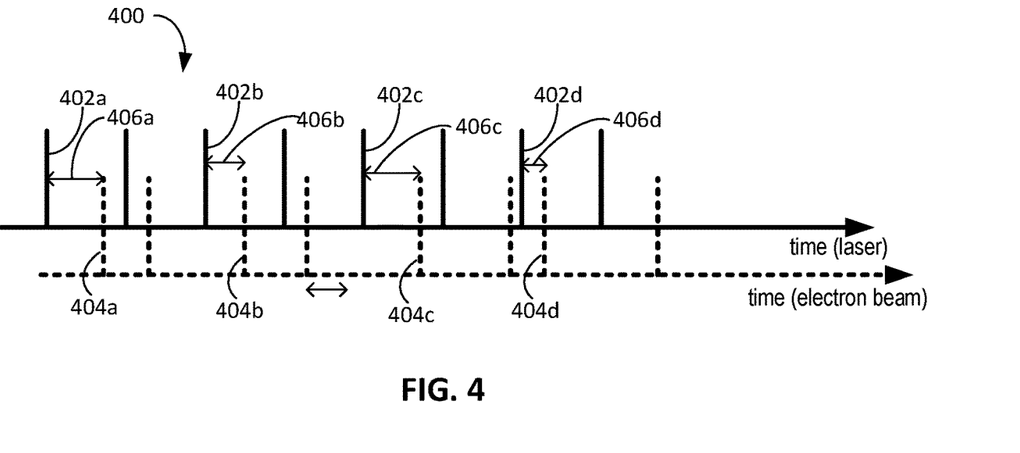
FIG. 4 is a schematic diagram illustrating delays between light pulses and charged particle pulses, according to some embodiments.

FIG. 4 shows a timing sequence 400 in which a laser source produces light pulses (e.g., 402a, 402b, 402c, 402d) at a repetition rate (e.g., 1 kHz) that is identical to the repetition rate of the pulses of electrons (e.g., 404a, 404b, 404c, 404d) emitted from the accelerator 160. There is shot-to-shot jitter between pulses of electrons. There is also shot-to-shot jitter between light pulses. To improve clarity, FIG. 4 shows optical pulses without shot-to-shot jitter. In general, there is jitter in both the optical pulses and the electron pulses. In some embodiments, the laser light pulses 402a-402d have a smaller shot-to-shot timing jitter compared to the electron pulses. The timing synchronization described herein is able to measure a time of arrival of each electron pulse relative to a corresponding light pulse.

For example, a first delay 406a between the light pulse 402a and the electron pulse 404a is larger than a delay 406b between the light pulse 402b and the electron pulse 404b. Magnitudes of changes in time delays are exaggerated for illustration purposes in FIG. 4. Due to differences in the delays 406a-406d, x-ray pulses generated by the electron pulses 404a-404d would appear on different spatial locations on a scintillator 162 (shown in FIG. 1D), depending on a time of arrival of the electron pulse relative to its corresponding light pulse (e.g., between a respective electron-light pair: 404a and 402a; 404b and 402b, etc.).

When the repetition rate of the laser pulses is the same to the repetition rate of the electron pulses (except for jitter), the methods and apparatus disclosed herein provide a way to provide shot-to-shot timing synchronization for every electron pulse that is produced by the accelerator 160. For example, in an experiment involving optical pump pulses (e.g., first portion 156a) and x-ray probe pulses (e.g., x-ray pulse 320a), a precise timing for every x-ray probe pulse is determined relative to the optical pump pulses, even when there is shot-to-shot jitter in both the optical light pulses (e.g., 402a) and the electron pulses (e.g., 404a). In other words, because the light (1) sent directly to the experiment, (2) the light used to generate the x-ray pulse for probing, and (3) the light used to generate the x-ray pulse for timing synchronization, come from a common laser source, the jitters in the light pulses are the same, and the timing of the x-ray pulse can be synchronized to the timing of the light used for the experiment.

In some embodiments, a distance L (shown in FIG. 1D) between the location 180 and the scintillator 162 is about 20 cm (e.g., less than 40 cm, less than 30 cm, less than 20 cm, less than 10 cm, more than 5 cm). The scintillator 162 is placed inside a vacuum housing 148 (shown in FIG. 1C) within which the electron beam is enclosed, and the distance L can be adjusted within the housing 148. In some embodiments, the camera 164 is a CCD camera. In some embodiments, the camera 164 is outside the vacuum housing. In some embodiments, additional optics are used to image the scintillator 162 onto an image sensor on the CCD camera.

Figure 2A:
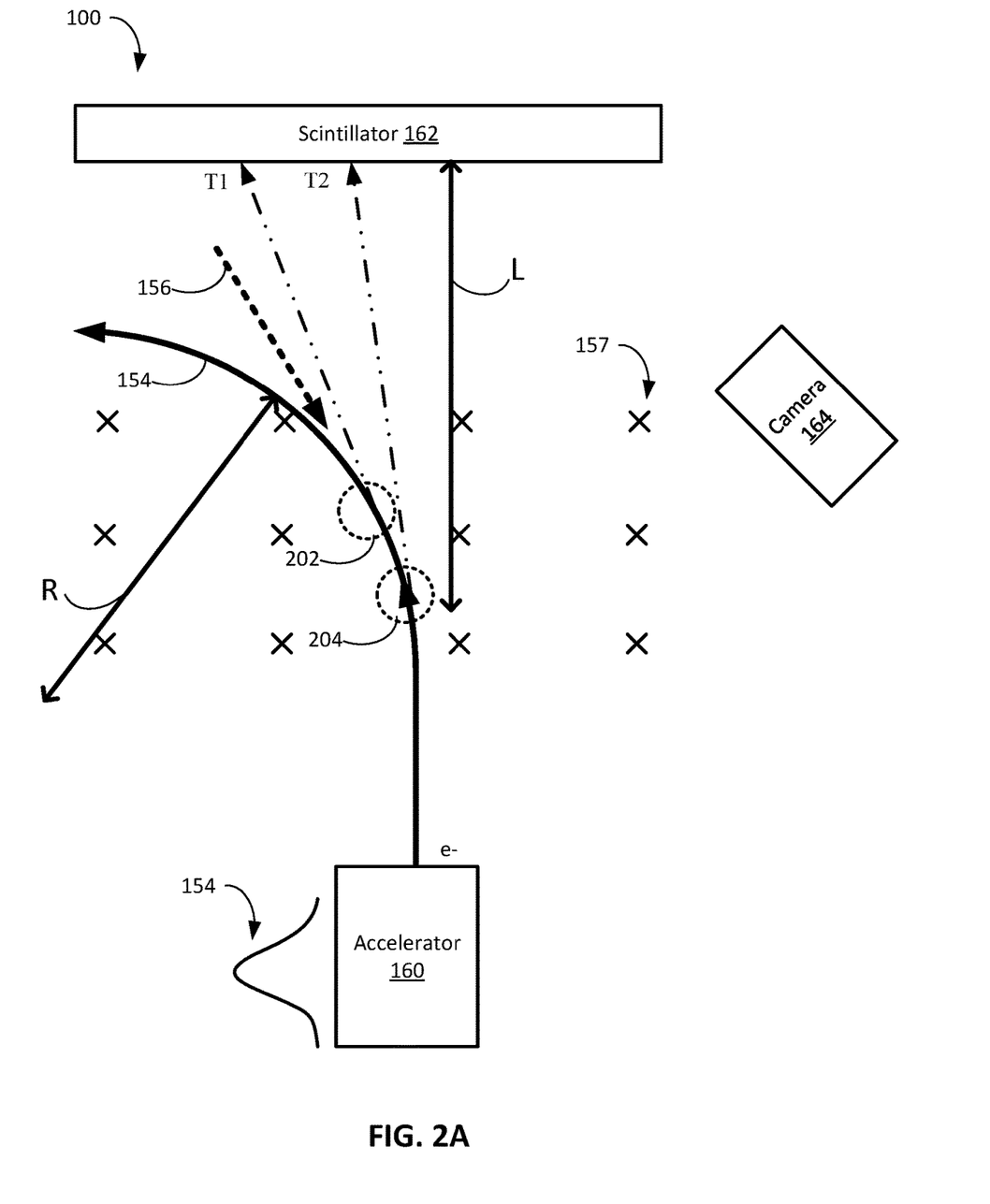
FIG. 2A is a schematic diagram illustrating an apparatus for synchronizing charged particle pulses with light pulses, according to some embodiments.

Using ICS, the x-rays are emitted in a direction tangential to the path of the electron beam 154. FIG. 2A shows a trajectory of the electron beam 154 curved by the magnetic field 157. The methods and systems disclosed herein are not limited to embodiments in which the light beam 156 has low shot-to-shot timing jitter, and every pulse of the light beam 156 arrives at substantially the same location at the same time instance after leaving the light source. Rather, the methods and systems detect a time of arrival of the electron pulse relative to its corresponding light pulse (e.g., electron pulse 404a against light pulse 402a).

For example, when the electron beam 154 arrives slightly earlier than its corresponding light pulse, the direction that the x-rays are emitted will be different than if the electron beam 154 arrives slightly later. For example, when the electron beam 154 arrives slightly earlier (relative to light beam 156), at relative time=T1, it would have travelled a longer distance to a position 202, before intersecting with the light beam 156. Conversely, when the electron beam 154 arrives slightly later (relative to light beam 156), at relative time=T2, electron beam 154 would have travelled a shorter distance to a position 204 before intersecting light beam 156. Thus, the position of scintillation on the scintillator 162 is convertible to a measurement of a timing synchronization between the pulsed electron beam 154 and the pulsed light beam 156. T1 and T2 are marked on FIG. 2, and T1 is earlier (e.g., the electron beam 154 arrives earlier in time relative to the light beam 156) than T2.

In some embodiments, the methods and systems provide a time resolution of about 80 fs. For example, the timing synchronization apparatus 150 is able to distinguish between a first electron pulse that arrives 80 fs or more earlier or later relative to its corresponding light pulse than a second electron pulse.

In some embodiments, the apparatus 100 is calibrated for synchronizing timing between the electron beam 154 and the light beam 156. For example, a calibration determines how a distance between luminescence emitted from two spatial points on the scintillator 162 corresponds to a particular time delay (between the electron beam 154 and the light beam 156).

Known Time-Delay

In some embodiments, a known delay is applied to the electron beam 154 to introduce additional (known) delay (e.g., 500 fs) to the electron beam. In general, the known delay can be added electronically to the electron beam or it can be added optically to delay the optical pulse from the laser (e.g., by sending the optical pulse through a variable delay stage).

A first position of the luminescence produced by a x-ray pulse generated from the ICS interaction of the delayed electron beam and the light beam 156 is recorded on the scintillator 162, and imaged by camera 164. In some embodiments, it is the light beam 156 that is delayed relative to the electron beam. After the known delay is removed from the electron beam, a second position of the luminescence produced by another x-ray pulse generated from the ICS interaction of the electron beam and the light beam 156 is recorded on the scintillator 162. The second (i.e., delayed) electron pulse is subject to the same shot-to-shot jitter that the timing synchronization accounts for. For example, the electron beam shot-to-shot jitter averages 300 fs (given a time resolution of 80 fs). By applying a delay of 500 fs, the measured pulse could be anywhere from an actual delay of 200 fs to 800 fs.

Figure 2B:
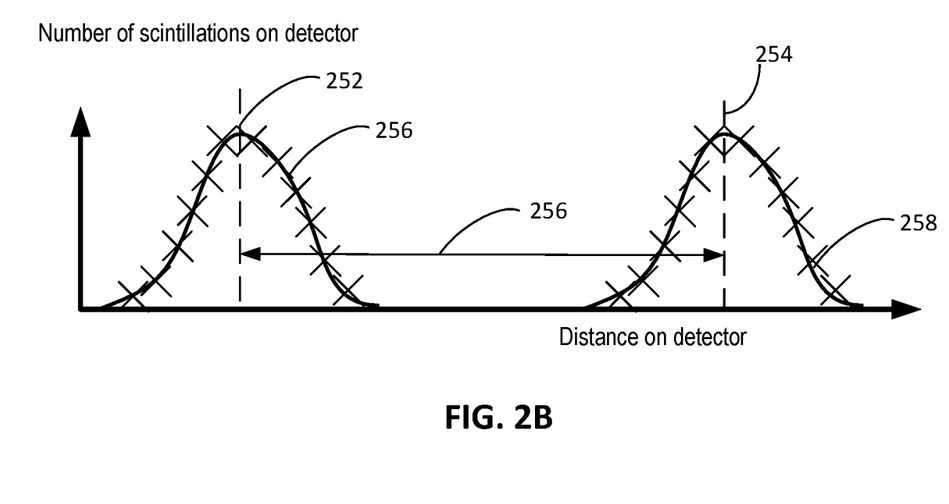
FIG. 2B is a schematic diagram illustrating a method of calibrating the apparatus of FIG. 2A, according to some embodiments.

FIG. 2B shows a distribution of electron pulses as observed on the detector (e.g., scintillator 162). In some embodiments, a first number of electron pulses (e.g., 100) are measured without the time delay to determine an average 252 of a distribution 256 of the times of arrival of the electron pulses. A known time delay is added to either the electron beam or the light beam, and a second number of electron pulses (e.g., 100) are measured with the time delay to determine an average 254 of a distribution 258 of the times of arrival of the electron pulses. Image processing techniques, for example, are used to measure a distance between the first position in the first image and the second position in the second image. A spatial distance 256 between the average 252 and the average 254 provides a calibration. The calibration is obtained by taking a ratio between the distance between distributions 256 and the known time delay. For example, a distance of 10 mm on the scintillator corresponds to a time difference (e.g., the known time delay) of 500 fs.

Time-Delay Based on System Parameters

Figure 2C:
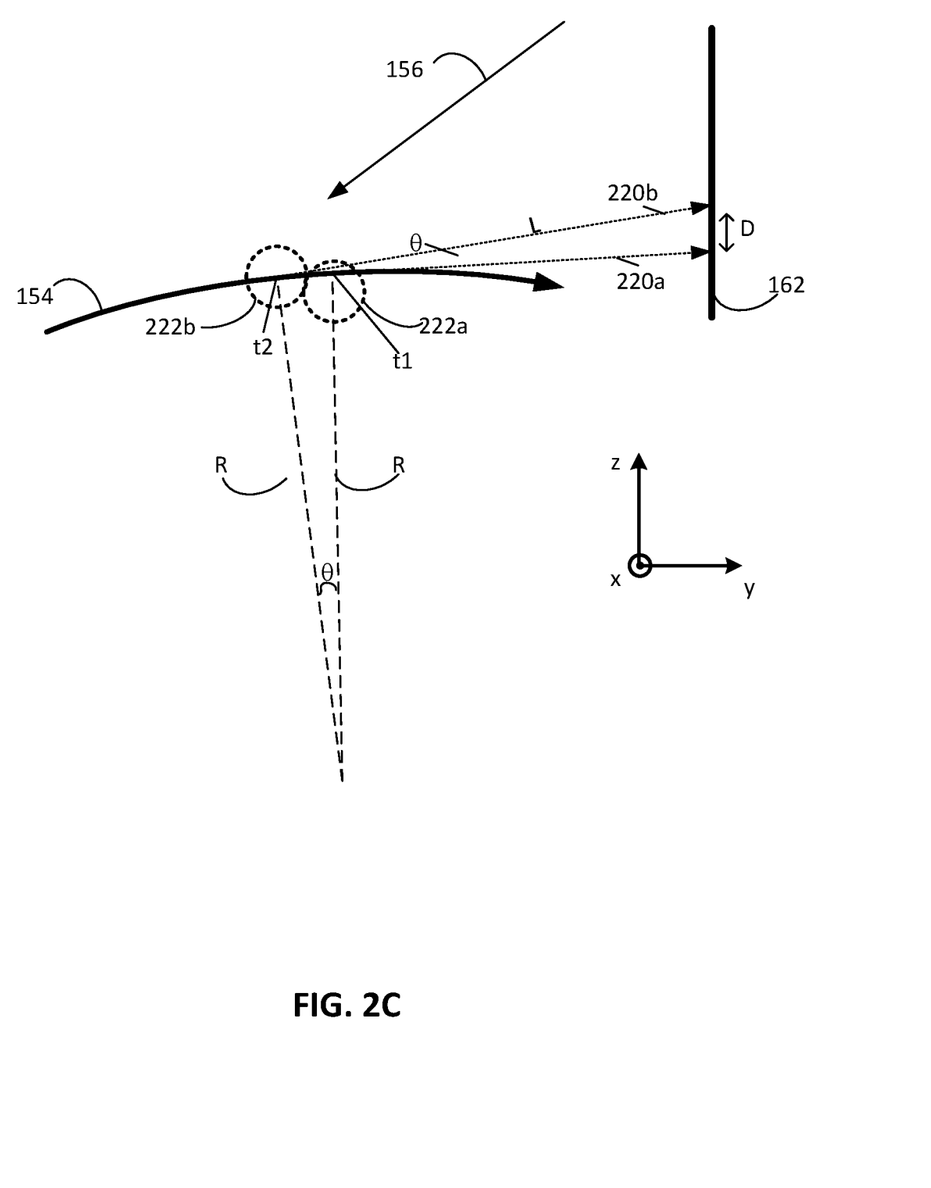
FIG. 2C is a schematic diagram illustrating a method of determining a time synchronization of charged particle pulses relative to light pulses, according to some embodiments.

FIG. 2C illustrates how system parameters are used to obtain timing synchronization between a pulse of an electron beam and a pulsed light beam. For ease of illustration, dimensions are greatly exaggerated along the y-direction.

A first pulse of electron beam 154, having an earlier time of arrival, travels further along its circular trajectory before intersecting the light beam 156 at a position 222a, at time t1. The first pulse of electron beam 154 undergoes ICS with the light beam 156, producing a first x-ray pulse 220a that impinges on the scintillator 162. A second pulse of electron beam 154, having a later time of arrival, travels a shorter distance along its circular trajectory before intersecting the light beam 156 at a position 222b, at time t2, which is later than t1. The second pulse of electron beam 154 undergoes ICS with the light beam 156, producing a second x-ray pulse 220b that impinges on the scintillator 162.

A time shift $\Delta t$ between arrival times of the two electron pulses relative to their respectively light pulses equals the difference between the time of arrival t1 of the first electron pulse, and the time of arrival t2 of the second electron pulse. The time difference $\Delta t$ is equivalent to the time taken by an electron beam to travel a distance ds on the arc, between the position 222a and the position 222b. Note that $ds=R*\theta$ where R is the radius of curvature of the electron beam's trajectory, and $\theta$ is the angle subtended by the arc between the positions 222a and 222b. The electron beam travels nearly the speed of light c.

$$\Delta t = t2 - t1$$
$$= \frac{ds}{c}$$
$$= \frac{R*\theta}{c}$$

Similarly, the distance D between the locations were the x-ray pulses 220a and 220b impinge on the scintillator is related to (for small angles) a distance L, the distance between the electron beam (e.g., at positions 222a and 222b) and the scintillator 162 according to the equation $D=L*\theta$. Equating $\theta$:

$$\theta = \frac{D}{L}$$
$$= \frac{\Delta t * c}{R}$$

Gives a direct measure of the time difference $\Delta t$:

$$\Delta t = \frac{R*D}{c*L}$$

As c, R, L are all known, measuring D provides $\Delta t$. Note that, because the locations of intersection between the electron beam and the light beam are close together, L is nearly constant (and can be assumed to be constant for the purposes of approximation).

Figure 3:
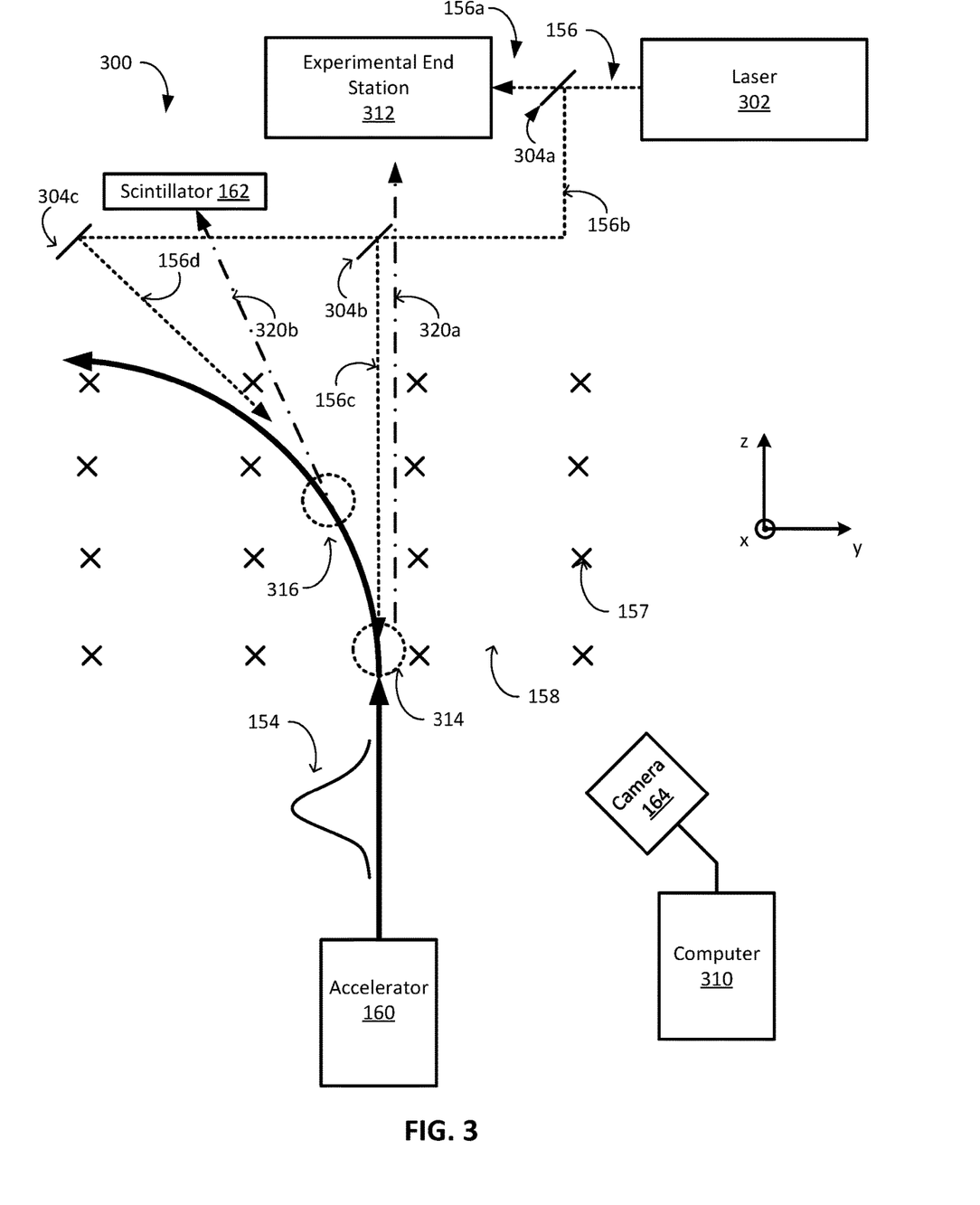
FIG. 3 is a schematic diagram illustrating an x-ray source with an apparatus for synchronizing charged particle pulses with light pulses (e.g., where the interaction of the charged particle pulse and the light pulse produce the x-rays), according to some embodiments.

FIG. 3 shows an x-ray source 300, in accordance with embodiments in which a laser 302 produces light that is split for multiple uses. A first portion 156a of the light 156 is directed towards an experimental end station 312 for use in an experiment. In some embodiments, the first portion 156c of light is used to excite (e.g., "pump") an experimental sample placed in the experimental end station 312. A second portion 156b of the light 156 is directed by a first beamsplitter 304a towards the electron beam 154 emitted by the accelerator 160.

The second portion 156b of the light 156 is further divided by a second beamsplitter 304b into two separate arms: a third portion 156c, and a fourth portion 156d. The third portion 156c of the light beam 156 in the first arm is directed to an interaction point 314, where the electron beam 154 and the light beam 156 interact through ICS to produce a pulsed x-ray beam 320a that is directed towards the experimental setup 312. In some embodiments, at the interaction point 314, a size of the electron beam 154 is on the micron level. In some embodiments, the optical light beam has a beam diameter on the order of tens of microns, and is able to easily intersect the narrower electron beam.

The fourth portion 156d of the light 156 in the second arm is directed by additional optics (e.g., a mirror 304c) to interact with the electron beam 154 in a first region 158 that is under the influence of a magnetic field 157. For example, the fourth portion 156d of light interacts with the electron beam 154 in a second region 316 to produce second x-ray pulse 320b. Because of the presence of the magnetic field 157, the second region 316 is along the circular or helical trajectory of the electron beam 154. Because the optical light beam has a beam diameter on the order of tens of microns, it is able to easily intersect the narrower electron beam at multiple positions along the circular trajectory. In addition, a temporal profile of the relativistic beam 154 is not significantly changed after the first ICS interaction at the interaction point 314. As a result, measuring a time of arrival of the electron beam in the second region 316 is equivalent to measuring a time of arrival of the electron beam at the interaction point 314. In some embodiments, a spatial profile of the relativistic beam 154 changes after further propagation.

In some embodiments, more energy is sent to the third portion 156c than the fourth portion 156d. In some embodiments, 99% of the energy from the second portion 156b is sent to the third portion 156c and 1% of the energy is sent to the fourth portion 156d.

The actual location of the second region 316 depends on a time of arrival of the electron beam 154. An electron beam that arrives later, with respect to the fourth portion 156d of the light, would intersect the fourth portion 156d of the light at a location closer to the interaction point 314 illustrated in FIG. 3.

When the time of arrival of the electron beam is later than the fourth portion 156d of the light, the interaction point 314 also moves further down along the −z direction than is illustrated in FIG. 3. In such a case, the x-ray pulse produced from the second region 316 would strike a different portion of the scintillator 162 (e.g., in a region along the +y direction on the scintillator 162).

Similarly, an electron beam that arrives earlier, with respect to the fourth portion 156d of the light, would intersect the fourth portion 156d of the light at a location further from the interaction point 314 illustrated in FIG. 3. In such a case, the interaction point 314 moves further up along the +z direction than is illustrated in FIG. 3. The x-ray pulse produced from the second region 316 would then strike a different portion of the scintillator 162 (e.g., in a region along the −y direction on the scintillator 162).

Since the third portion 156c and the fourth portion 156d are produced by the same light source (e.g., laser source 302), their timing synchronization is relatively fixed (e.g., based on optical path lengths of the two portions) and easy to determine. For example, an absolute distance between the interaction point 314 and the second region 316 is determined by the difference between optical path lengths of the third portion 156c of the light and the fourth portion 156d of the light beam 156 to their respective locations where ICS occurs (i.e., the difference in the lengths of the paths travelled by the third portion 156c and the fourth portion 156d after the second beamsplitter 304b). The absolute distance is not affected by a time of arrival of the electron beam relative to the light beam 156 from the laser source 302. Thus, the timing relationship between the x-ray pulse 320b (used for timing synchronization), and the x-ray pulse 320a (used for experiments), is fixed. Any change in the position of the scintillation caused by the x-ray pulse 320b on the scintillator 162 indicates a shot-to-shot change in a time of arrival of the electron pulse 154, relative to the light pulse 156.

In some embodiments, the x-ray pulse 320a can be delayed or advanced relative to the first portion 156a by changing an optical path length of the second portion 156b, between the first beamsplitter 304a and the second beamsplitter 304b. Fine-tuning of the actual timing between the first portion 156a and the x-ray pulse 320a is provided by the measurement recorded on the scintillator 162.

Having the interaction point 314 be just outside of the magnetic field 107 better allows the x-ray pulse 320a to reach the experimental end station 312 without significant (e.g., any) adjustment of x-ray optics regardless of the arrival time of the electron beam 154. In such cases, the electron beam used to produce the x-ray pulses 320a does not yet move along a circular or helical trajectory. Because ICS produces x-ray pulses that emits tangentially from a direction of travel of the electron beam, when the electron beam 154 travels along a straight line (e.g., along the +z direction), the emitted x-ray pulse 320a would also travel along the +z direction no matter the actual location along the z-direction where the third portion 156c of the light 156 intersects with the electron beam 154 and produces x-ray pulses via ICS.

X-ray source 300 further includes a computer system 310 including one or more processors and memory storing instructions for converting the measured position to a measurement of a timing synchronization between the pulsed charged particle beam and the pulsed light beam. In some embodiments, the computer system 310 receives images from the camera 164.

It will be understood that although the terms "first," "second," etc. may be used herein to describe various elements, these elements should not be limited by these terms. These terms are only used to distinguish one element from another. For example, a first widget could be termed a second widget, and, similarly, a second widget could be termed a first widget, without changing the meaning of the description, so long as all occurrences of the "first widget" are renamed consistently and all occurrences of the "second widget" are renamed consistently. The first widget and the second widget are both widgets, but they are not the same widget.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for propose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   directing a first light beam to intersect with a charged particle beam at a first location in a first region to produce a first x-ray beam;
   detecting a position on a detector where at least a portion of the first x-ray beam impinges; and determining a timing synchronization of the charged particle beam relative to the first light beam based on the position.

2. The method of claim 1, further comprising:
directing a second light beam to intersect the charged particle beam, before the first light beam intersects the charged particle beam, to produce a second x-ray beam; and
directing the second x-ray beam to an experimental end station.

3. The method of claim 2, wherein the first light beam and the second light beam are derived from a common light source.

4. The method of claim 3, further comprising directing a third light beam from the common light source to the experimental end station.

5. The method of claim 3, wherein a larger portion of energy from the common light source is in the second light beam than in the first light beam.

6. The method of claim 1, wherein the charged particle beam travels along a curved trajectory caused by a magnetic field in the first region.

7. The method of claim 6, wherein the timing synchronization is a function of a position along the curved trajectory at which the first light beam intersects the charged particle beam.

8. The method of claim 7, wherein the position on the detector is determined by the position along the curved trajectory at which the first light beam intersects the charged particle beam.

9. The method of claim 6, further comprising selecting a magnitude of the magnetic field so that charged particles having a central energy in the charged particle beam travel along a selected path.

10. The method of claim 1, further comprising:
recording a first position on the detector where a first x-ray pulse impinges, the first x-ray pulse generated using a first pulse of the charged particle beam and a first pulse of the first light beam;
recording a second position on the detector where a second x-ray pulse impinges, the second x-ray pulse generated using a second pulse of the charged particle beam and a second pulse of the first light beam; and
converting a distance between the first position and the second position to time delays between respective times of arrival of respective pulses of the charged particle beam relative to respective pulses of the first light beam.

11. The method of claim 10, wherein converting the distance to the time delay is based on a distance between the first location and the detector.

12. The method of claim 1, wherein the first x-ray beam is produced through inverse Compton scatter (ICS).

13. The method of claim 1, wherein the charged particle beam is a relativistic beam.

14. The method of claim 1, wherein the first light beam is a pulsed laser beam.

15. The method of claim 1, wherein the charged particle beam comprises an electron beam.

16. The method of claim 15, wherein the electron beam comprises pulses of electrons.

17. The method of claim 16, wherein the first light beam comprises pulses of light and a repetition rate of the pulses of light is equal to a repetition rate of the pulses of electrons.

18. The method of claim 17, wherein the repetition rate is 1 kHz.

19. A time synchronization device, comprising:
a detector configured to measure a position where an x-ray pulse produced by a charged particle beam impinges on the detector;
a camera configured to produce an image of the position on the detector where the x-ray pulse impinges; and
a computer system including one or more processors and memory storing instructions for converting the position on the detector to a measurement of a timing synchronization between the charged particle beam and a light beam.

20. The time synchronization device of claim 19, wherein the x-ray pulse is produced by colliding the charged particle beam with the light beam from a light source.

21. The time synchronization device of claim 20, wherein the charged particle beam collides with the light beam in a region having a magnetic field.

22. The time synchronization device of claim 21, wherein the magnetic field is configured to cause the charged particle beam to travel on a curved trajectory.

23. The time synchronization device of claim 19, wherein the detector is configured to be placed within a housing that is held under vacuum.

24. The time synchronization device of claim 23, wherein the camera is configured to be placed outside the housing.

25. The time synchronization device of claim 19, wherein the detector comprises a scintillator, and the scintillator is configured to emit luminescence when excited by the x-ray pulse.

26. The time synchronization device of claim 25, wherein the scintillator comprises a yttrium aluminum garnet (YAG) screen.

27. The time synchronization device of claim 19, wherein the charged particle beam is produced by an accelerator.

28. The time synchronization device of claim 19, wherein the charged particle beam is a relativistic beam.

29. The time synchronization device of claim 19, wherein the light beam comprises a pulsed laser beam.

30. The time synchronization device of claim 19, wherein the charged particle beam comprises an electron beam.

31. The time synchronization device of claim 30, wherein the electron beam comprises pulses of electrons.

32. The time synchronization device of claim 31, wherein the light beam comprises pulses of light and a repetition rate of the pulses of light is equal to a repetition rate of the pulses of electrons.

33. The time synchronization device of claim 32, wherein the repetition rate is 1 kHz.

34. A method, comprising:
determining a timing synchronization between an electron pulse and a light pulse;
generating an x-ray pulse by colliding the light pulse with the electron pulse at a first location;
measuring a position on a detector where the x-ray pulse impinges; and
calculating the timing synchronization based on the position and a distance between the detector and the first location.

35. The method of claim 34, wherein the first location is within a magnetic field and the electron pulse travels along a circular trajectory.

36. The method of claim 35, wherein calculating the timing synchronization further comprises using a value of a radius of curvature of the circular trajectory of the electron pulse.

* * * * *